United States Patent
Kim et al.

(10) Patent No.: US 7,312,001 B2
(45) Date of Patent: Dec. 25, 2007

(54) NON-AQUEOUS ELECTROLYTIC SOLUTION AND LITHIUM BATTERY EMPLOYING THE SAME

(75) Inventors: Ju-yup Kim, Seoul (KR); Myung-dong Cho, Kyungki-do (KR); Young-gyoon Ryu, Kyungki-do (KR)

(73) Assignee: Samsung SDI Co., Ltd., Suwon, Kyungki-do (KR)

( * ) Notice: Subject to any disclaimer, the term of this patent is extended or adjusted under 35 U.S.C. 154(b) by 617 days.

(21) Appl. No.: 10/669,464

(22) Filed: Sep. 25, 2003

(65) Prior Publication Data

US 2004/0096750 A1    May 20, 2004

(30) Foreign Application Priority Data

Nov. 16, 2002    (KR) .................. 10-2002-0071397

(51) Int. Cl.
*H01M 6/16* (2006.01)
(52) U.S. Cl. ............ 429/341; 429/343; 429/337; 429/326; 429/329; 429/231.1; 429/218.1; 429/231.8; 429/231.95
(58) Field of Classification Search ............ 429/326, 429/330, 332, 333, 334, 335, 341, 231.1, 429/218.1, 231.8, 343, 337, 329, 231.95
See application file for complete search history.

(56) References Cited

U.S. PATENT DOCUMENTS 5,580,683 A * 12/1996 Takeuchi et al. ............ 429/333

FOREIGN PATENT DOCUMENTS

| CN | 01335652 A |   | 2/2002 |
|----|------------|---|--------|
| JP | 54-75534   | * | 6/1979 |
| JP | 54-75535   | * | 6/1979 |
| JP | 06-267589  |   | 9/1994 |
| JP | 07-272756  |   | 10/1995 |
| JP | 08-096849  | * | 4/1996 |
| JP | 08-138740  |   | 5/1996 |
| JP | 08-162154  |   | 6/1996 |
| JP | 08-190932  |   | 7/1996 |
| JP | 09-245838  |   | 9/1997 |
| JP | 11-135148  | * | 5/1999 |
| JP | 2000-223153 | * | 8/2000 |
| JP | 2000-223153 A |  | 8/2000 |
| JP | 2002-367673 | * | 12/2002 |
| JP | 2003-282138 |   | 10/2003 |

OTHER PUBLICATIONS

Japanese Notice of Ground of Rejection for JP Patent Application No. 2003-385057, dated Jun. 20, 2006.
* The Patent Office of the People's Republic of China, Application No.: 031587275, Apr. 1, 2005.
Besenhard et al, "High Energy Density Lithium Cells", *J. Electroanal. Chem.*, 68, 1-18 (1976).

(Continued)

*Primary Examiner*—Laura Weiner
(74) *Attorney, Agent, or Firm*—Buchanan Ingersoll & Rooney PC

(57) ABSTRACT

A non-aqueous electrolytic solution and a lithium battery employing the same are provided. The non-aqueous electrolyte solution that contains a substituted or unsubstituted acetate can effectively stabilize lithium metal and improve the conductivity of lithium ions.

16 Claims, 4 Drawing Sheets

OTHER PUBLICATIONS

Wang et al, "Effect of Additives on Lithium Cycle Performance", pp. 59-60, *37th Battery Symposium in Japan*, 59-60 (1995).

Naoi et al, "Modification of the Lithium Metal Surface by Nonionic Polyether Surfactants", *Journal of The Electrochemical Society*, 147 (3), 813-819 (2000).

Ishikawa et al, "Electrochemical control of a Li metal anode interface: improvement of Li cyclability by inorganic additives compatible with electrolytes", *Journal of Electroanalytical Chemistry*, 473, 279-284 (1999).

* cited by examiner

NON-AQUEOUS ELECTROLYTIC SOLUTION AND LITHIUM BATTERY EMPLOYING THE SAME

BACKGROUND OF THE INVENTION

This application claims priority from Korean Patent Application No. 2002-71397, filed on Nov. 16, 2002, in the Korean Intellectual Property Office, the disclosure of which is incorporated herein in its entirety by reference.

1. Field of the Invention

The present invention relates to a non-aqueous electrolytic solution and a lithium battery employing the same, and more particularly, to a non-aqueous electrolytic solution capable of stabilizing lithium metal and improving lithium ionic conductivity and a lithium battery employing the same.

2. Description of the Related Art

With the increasing need for smaller, lighter portable electronic devices, such as camcoders, portable communications devices, and portable computers, the need for more compact, lighter, higher capacitance batteries as a driving source of such portable electronic devices is increasing and considerable research into such batteries is being conducted.

Currently commercially available lithium ion secondary batteries utilize carbon as an anode active material and transition metal oxide, mostly $LiCoC_2$, as a cathode active layer. Carbon, which is used as an anode active material, has a theoretical energy density of 372 mA/g, which is considerably lower than lithium metal that has an energy density of 3680 mA/g.

Lithium metal batteries utilize lithium metal, instead of carbon, as an anode active material. The volume and weight of batteries can be considerably reduced when lithium metal, instead of carbon, is utilized as an anode active material. This is the most important advantage of lithium metal batteries and is the main reason for a great deal of research into lithium metal batteries.

However, lithium metal batteries have problems of rapid capacitance drop with frequent charging/discharging cycles, volume change during charging/discharging, and safety concerns. These problems are caused by the dendric growth of lithium during charging/discharging. Lithium metal has a lowest density of 0.53 $g/cm^2$, a greatest potential difference of −3.045V compared to a standard hydrogen electrode, a highest energy density of 3860 mAh/g, among other metals. Despite these advantages of lithium metal, secondary batteries with an anode made of lithium metal are not commercially available yet.

In order to solve the problem of dendric growth of lithium during charging/discharging, considerable research has been conducted. Accordingly, methods of stabilizing lithium by preventing lithium from growing into dendrites can be classified into two categories: physical methods, which involve forming a protective layer, and chemical methods.

Besenhard et al. have found that the structure of lithium greatly depends on the chemical composition and physical structure of a film deposited thereon and that physical and chemical non-uniformity of the film on the surface of the lithium electrode leads to the formation of lithium (J. of Electroanial. Chem., 1976, 68, 1).

Recently, Yoshio et al., have improved the reversibility of the lithium anode by controlling the surface state of the lithium anode(37th Battery Symposium in Japan). This research involves utilizing additives in an electrolytic solution or the lithium metal anode, so as to improve the surface properties of the lithium metal anode. As an example, the surface properties of the lithium metal anode have been effectively improved by forming on the lithium metal anode a dense, thin, even surface layer, which contains carbon dioxide, 2-methylfurane, magnesium iodide, benzene, pyridine, hydrofurane, or a surfactant. The purpose of this research was to prevent lithium dendrites from growing on the lithium metal anode through the formation of an even protective layer having higher lithium ionic conductivity to induce uniform current distribution over the lithium metal anode.

K. Naoi et al. have suggested the adsorption of polyethyleneglycol dimethylether onto the surface of the lithium anode as a protective coating, based on the fact that a core portion of a spiral ethylene oxide chain in polyethyleneglycol dimethylether can serve as a lithium ion path during charging/discharging (J. of Electrochem. Soc., 147, 813 (2000)). M. Ishikawa et al. have showed that the addition of aluminum iodide ($AlI_3$) or magnesium iodide ($MgI_2$) in an organic electrolyte leads to the formation of a lithium alloy through reaction with the lithium anode, suppresses the growth of lithium dendrites, and improves the change/discharge efficiency (M. Ishikawa et al., J. of Electrochem., 473, 279(2000)). However, such protective layers are damaged during frequent charging/discharging operations or when they are soaked in an electrolytic solution for a long time.

SUMMARY OF THE INVENTION

The present invention provides a non-aqueous electrolytic solution for use in lithium batteries that is less reactive with lithium and improves the conductivity of lithium ions and the charge/discharge efficiency of lithium batteries.

The present invention also provides a lithium battery with improved charge/discharge efficiency by employing the above non-aqueous electrolytic solution.

In accordance with an aspect of the present invention, there is provided a non-aqueous electrolytic solution comprising a lithium salt, an organic solvent, and at least one of compounds having formula (1) below:

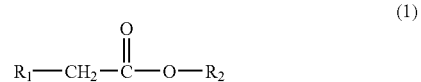
(1)

where $R_1$ is selected from among a hydrogen atom, a halogen atom, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ alkenyl group, a substituted or unsubstituted $C_6$-$C_{30}$ aryl group, a substituted or unsubstituted $C_6$-$C_{30}$ aryloxy group, a substituted or unsubstituted $C_2$-$C_{30}$ heteroaryl group, a substituted or unsubstituted $C_2$-$C_{30}$ heteroaryloxy group, and

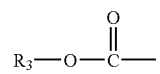

where $R_3$ is selected from among a hydrogen atom, a halogen atom, a substituted or unsubstituted $C_1$-$C_{20}$ alkyl group, a substituted or unsubstituted $C_1$-$C_{20}$ alkenyl group, a substituted or unsubstituted $C_6$-$C_{30}$ aryl group, and a substituted or unsubstituted $C_2$-$C_{30}$ heteroaryl group;

and $R_2$ is selected from among a hydrogen atom, a halogen atom, a substituted or unsubstituted $C_1$-$C_{20}$ alkyl group, a substituted or unsubstituted $C_1$-$C_{20}$ alkenyl group, a substituted or unsubstituted $C_6$-$C_{30}$ aryl group, and a substituted or unsubstituted $C_2$-$C_{30}$ heteroaryl group.

In accordance with another aspect of the present invention, there is provided a lithium battery comprising a cathode, an anode, a separator interposed between the cathode and the anode, and the above non-aqueous electrolytic solution. The cathode may contain at least one of a lithium composite oxide, a simple substance sulfur, kasolite containing dissolved $Li_2S_n$ where $n \geq 1$, organo-sulfur, and a carbon-sulfur composite polymer expressed as $(C_2S_x)_y$ where x ranges from 2.5 to 20 and $y \geq 2$. The anode may be a lithium metal electrode, a lithium-metal alloy electrode, or a lithium-inert sulfur composite electrode.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
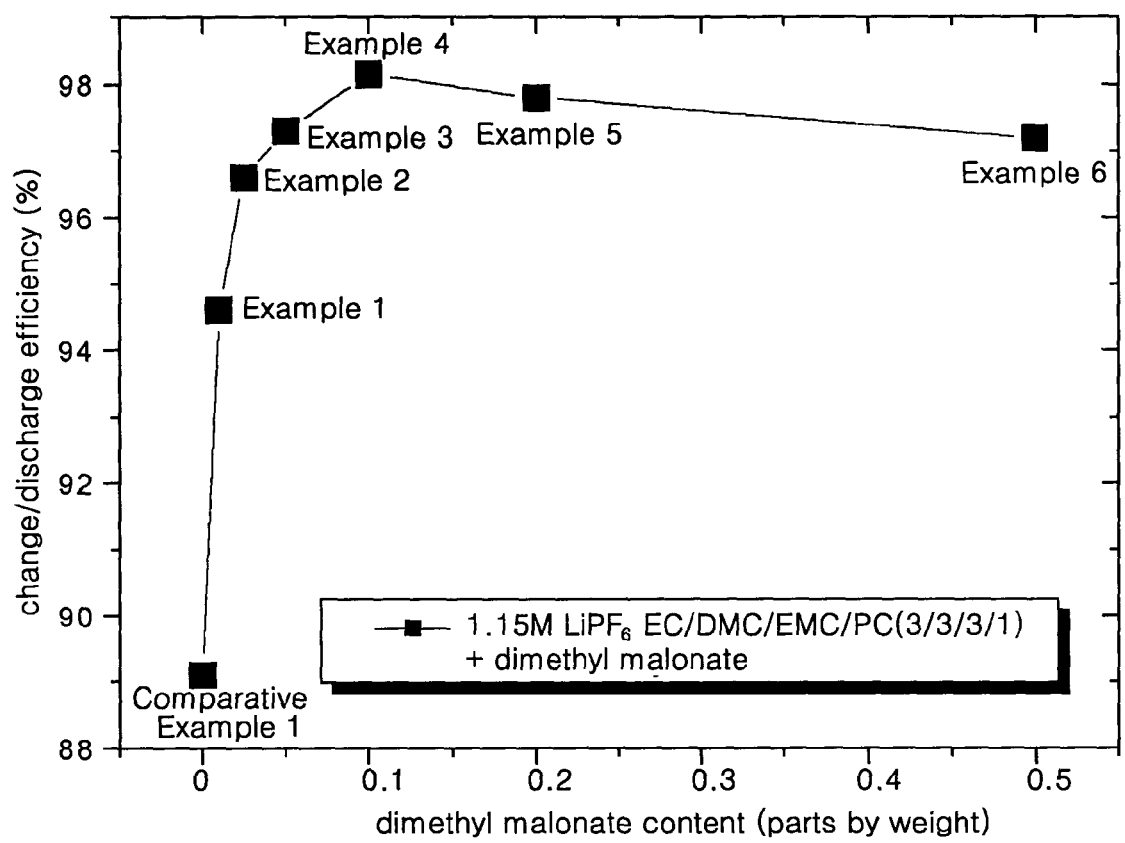
FIG. 1 is a graph of charge/discharge efficiency versus dimethyl malonate content for lithium ion secondary batteries manufactured in Examples 1 through 6 according to the present invention and Comparative Example 1.

Hereinafter, a non-aqueous electrolytic solution and a lithium battery employing the same according to the present invention will be described in detail.

In general, the charging/discharging behavior of lithium batteries greatly depends on the properties of films formed on the battery. In particular, the dendric lithium formed on a surface of a lithium metal anode during charging/discharging causes shorting out of the battery and adversely affects the lifespan of the battery.

When a lithium battery is charged, a solid electrolyte interface (SEI) is formed on the surface of the anode as a result of decomposition of the electrolytic solution therein. This SEI effectively suppresses the dentric growth of lithium and side reactions at the anode surface and improves the battery's lifespan. However, with repeated charging/discharging cycles of the battery, even the SEI deteriorates and the electrolytic solution decomposes more and more at the surface of the anode. Accordingly, in the present invention, the composition of an electrolytic solution for use in such lithium batteries is optimized to suppress the dendric growth of lithium on the surface of the lithium anode and improves the charge/discharge efficiency of the battery.

A non-aqueous electrolytic solution includes a lithium salt, an organic solvent, and at least one of compounds of formula (1) below:

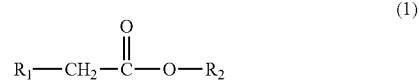

(1)

where $R_1$ is selected from among a hydrogen atom, a halogen atom, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ alkenyl group, a substituted or unsubstituted $C_6$-$C_{30}$ aryl group, a substituted or unsubstituted $C_6$-$C_{30}$ aryloxy group, a substituted or unsubstituted $C_2$-$C_{30}$ heteroaryl group, a substituted or unsubstituted $C_2$-$C_{30}$ heteroaryloxy group, and

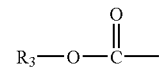

where $R_3$ is selected from among a hydrogen atom, a halogen atom, a substituted or unsubstituted $C_1$-$C_{20}$ alkyl group, a substituted or unsubstituted $C_1$-$C_{20}$ alkenyl group, a substituted or unsubstituted $C_6$-$C_{30}$ aryl group, and a substituted or unsubstituted $C_2$-$C_{30}$ heteroaryl group;

and $R_2$ is selected from among a hydrogen atom, a halogen atom, a substituted or unsubstituted $C_1$-$C_{20}$ alkyl group, a substituted or unsubstituted $C_1$-$C_{20}$ alkenyl group, a substituted or unsubstituted $C_6$-$C_{30}$ aryl group, and a substituted or unsubstituted $C_2$-$C_{30}$ heteroaryl group.

The compound of formula (1) above added into the non-aqueous electrolyte suppresses the formation of dendric lithium on the surface of an electrode containing lithium metal. In particular, the compound of formula (1) above has a resonance structure in its molecular structure and forms a chelate compound through reactions with lithium ions in the electrolytic solution.

The chelate compound is adsorbed onto the surface of the lithium metal-containing electrode during charging and prevents the lithium metal-containing electrode from directly contacting the electrolytic solution. The chelate compound effectively prevents the decomposition of the electrolytic solution through reactions at the surface of lithium metal-containing electrode.

The non-aqueous electrolytic solution may contain the compound of formula (1) in an amount of 0.01-5 parts by weight, preferably, 0.01-1 parts by weight, with respect to 100 parts by weight of the organic solvent. If the amount of the compound of formula (1) is less than 0.01 parts by weight, it is impossible to obtain a desired effect. If the amount of the compound of formula (1) exceeds 5 parts by weight, the compound is adsorbed on the surface of the lithium-containing electrode too thick, so that the conductivity of lithium ions is greatly reduced.

The compound of formula (1) may be an acetate compound of formula (2) below or a malonate compound of formula (3) below, which may be used individually or in combination.

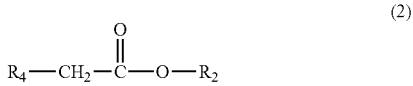
(2)

where $R_4$ is selected from among a hydrogen atom, a halogen atom, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ alkenyl group, a substituted or unsubstituted $C_6$-$C_{30}$ aryl group, a substituted or unsubstituted $C_6$-$C_{30}$ aryloxy group, a substituted or unsubstituted $C_2$-$C_{30}$ heteroaryl group, and a substituted or unsubstituted $C_2$-$C_{30}$ heteroaryloxy group; and $R_2$ is the same as defined above, and

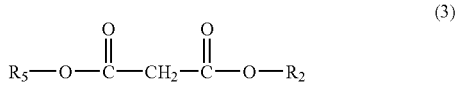
(3)

where $R_5$ is selected from among a hydrogen atom, a halogen atom, a substituted or unsubstituted $C_1$-$C_{20}$ alkyl group, a substituted or unsubstituted $C_1$-$C_{20}$ alkenyl group, a substituted or unsubstituted $C_6$-$C_{30}$ aryl group, and a substituted or unsubstituted $C_2$-$C_{30}$ heteroaryl group; and $R_2$ is the same as defined above.

Examples of a compound of formula (2) above include dimethyl acetate, methylethyl acetate, methylbutyl acetate, diethyl acetate, ethylmethyl acetate, ethylbutyl acetate, dibutyl acetate, butylethyl acetate, butylmethyl acetate, and the like.

Examples of a compound of formula (3) above include dimethyl malonate, methylethyl malonate, methylbutyl malonate, diethyl malonate, ethylmethyl malonate, ethylbutyl malonate, dibutyl malonate, butylethyl malonate, butylmethyl malonate, and the like.

Examples of the organic solvent for the non-aqueous electrolyte according to the present invention includes polyglymes, dioxolanes, carbonates, 2-fluorobenzene, 3-fluorobenzene, 4-fluorobenzene, dimethoxyethane, and diethoxyethane. These solvents may be used individually or in a combination of two or more.

Examples of polyglymes include diethyleneglycol dimethylether ($CH_3(OCH_2CH_2)_2OCH_3$), diethyleneglycol diethylether ($C_2H_5(OCH_2CH_2)_2OC_2H_5$), triethyleneglycol dimethylether ($CH_3(OCH_2CH_2)_3OCH_3$), and triethyleneglycol diethylether ($C_2H_5(OCH_2CH_2)_3OC_2H_5$). These polyglymes may be used individually or in a combination of two or more.

Examples of dioxolanes include 1,3-dioxolane, 4,5-diethyl-dioxolane, 4,5-dimethyl-dioxolane, 4-methyl-1,3-dioxolane, and 4-ethyl-1,3-dioxolane. These dioxolanes may be used individually or in a combination of two or more.

Examples of carbonates include methylene carbonate, ethylene carbonate, diethyl carbonate, dimethyl carbonate, γ-butyrolactone, propylene carbonate, methylethyl carbonate, and vinylene carbonate. These carbonates may be used individually or in a combination of two or more.

Preferred examples of the organic solvent include a mixture of ethylene carbonate (EC), dimethylcarbonate (DMC), ethylmethyl carbonate (EMC), and propylene carbonate (PC), a mixture of diethyleneglycol dimethylether, also known as diglyme (DGM), dimethoxyethane (DME), and 1,3-dioxolane (DOX), and the like.

In the non-aqueous electrolytic solution according to the present invention, any lithium salts which are commonly used in lithium batteries can be used. Examples of the lithium salt for the non-aqueous electrolytic solution include lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$), and lithium bistrifluoromethansulfonylamide ($LiN(CF_3SO_2)_2$). These lithium salts may be used individually or in a combination of two or more. The concentration of the lithium salt is preferably in a range of 0.5-2.0M. If the concentration of the lithium salt is less than 0.5M, the conductivity of lithium ions is too low. If the concentration of the lithium salt exceeds 2.0M, the lithium salt excessively reacts with lithium metal.

The above-described non-aqueous electrolytic solution according to the present invention can be applied to any kind of lithium battery, for example, lithium primary batteries, lithium secondary batteries, lithium polymer batteries, and lithium sulfur batteries.

Examples of an alkyl group as a substituent in the compounds used in the present invention include $C_1$-$C_{20}$ straight or branched radicals, preferably, $C_1$-$C_{12}$ straight or branched radicals, more preferably, $C_1$-$C_6$ lower alkyl radicals. Examples of such radicals include methyl, ethyl, n-propyl, isobutyl, sec-butyl, t-butyl, pentyl, iso-amyl, hexyl, and the like. However, $C_1$-$C_3$ lower alkyl radicals are most preferred.

Examples of an alkoxy group as a substituent in the compounds used in the present invention include oxygen-containing straight or branched radicals with $C_1$-$C_{20}$ alkyl moiety. $C_1$-$C_6$ lower alkoxy radicals, such as methoxy, ethoxy, propoxy, butoxy, and t-butoxy, are preferred. However, $C_1$-$C_3$ lower alkoxy radicals are more preferred. The above-listed alkoxy radicals may be substituted by one or more halogen atoms, such as fluorine, chlorine, or bromine, in order to give haloalkoxy radicals. However, $C_1$-$C_3$ lower haloalkoxy radicals are more preferred. Examples of such haloalkoxy radicals include fluoromethoxy, chloromethoxy, trifluoromethoxy, trifluoroethoxy, fluoroethoxy, fluoropropoxy, and the like.

The alkenyl group as a substituent in the compounds used in the present invention means a $C_2$-$C_{30}$ straight or branched aliphatic hydrocarbon group with carbon-carbon double bond. A preferred one contains from 2 to 12 carbon atoms, a more preferred one contains from 2 to 6 carbon atoms. Branched ones have at least one lower alkyl or lower alkenyl attached on a straight alkenyl group. Such alkenyl groups may be unsubstituted or substituted by at least one of halo, carboxy, hydroxy, formyl, sulfo, sulfino, carbamoil, amino, imino, and the like, without limitation to the forgoing examples. Examples of such alkenyl groups include ethenyl, prophenyl, carboxyethenyl, carboxyprophenyl, sulfinoethenyl, sulfonoethenyl, and the like.

The aryl group as a substituent in the compounds used in the present invention, which may be used alone or in combination, means a $C_6$-$C_{20}$ carbocyclic aromatic system containing at least one ring wherein such rings may be attached together in a pendent manner or may be fused. The term "aryl" embraces aromatic radicals, such as phenyl, naphthyl, tetrahydronaphthyl, indane, and the like, with phenyl being preferred. The aryl group may have one, two, or three substituents selected from among, for example, hydroxy, halo, haloalkyl, nitro, cyano, alkoxy, and lower alkylamino.

The aryloxy group as a substituent in the compounds used in the present invention means a group having the formula of aryl-O—. The aryl moiety of the aryloxy group is the same as defined above.

The heteroaryl group as a substituent in the compounds used in the present invention means a $C_6$-$C_{20}$ monocyclic or bicyclic aromatic radical containing one, two, or three hetero atoms selected from the group consisting of N, O, P, and S, other than carbon, the hetero atoms forming, for example, N-oxide or a quaternary salt, through oxidation or quaternation. Typical examples of heteroaryl groups, but are not limited to thienyl, benzothienyl, pyridyl, pyrazinyl, pyrimidinyl, pyridazinyl, quinolinyl, quinoxalinyl, imidazolyl, furanyl, benzofuranyl, thiazolyl, isoxazolyl, benzisoxazolyl, benzimidazolyl, triazolyl, pyrazolyl, pyrrolyl, indolyl, 2-pyridonyl, 4-pyridonyl, N-alkyl-2-pyridonyl, pyrazinonyl, pyridazinonyl, pyrimidinonyl, oxazolonyl, and N-oxides, such as pyridyl N-oxide, quinolinyl N-oxide, and quaternary salts of the forgoing groups.

The heteroaryloxy group as a substitutent in the compounds used in the present invention means a group having the formula of heteroaryl-O—. The heteroaryl moiety of the heteroaryloxy group is the same as defined above.

A method of manufacturing a lithium battery according to an embodiment of the present invention will be described.

Initially, a cathode and an anode are manufactured using common methods applied to manufacture lithium batteries. The cathode may contain at least one of a lithium composite oxide, a simple substance sulfur, kasolite containing dissolved $Li_2Sn$ where $n \geq 1$, organo-sulfur, and a carbon-sulfur composite polymer expressed as $(C_2S_x)_y$ where x ranges from 2.5 to 20 and $y \geq 2$. The anode may be a lithium metal electrode, a lithium-metal alloy electrode, or a lithium-inert sulfur composite electrode.

Next, a separator is interposed between the cathode and the anode and rolled to form an electrode assembly. Alternatively, the electrode assembly may be manufactured by sequentially stacking the cathode, the separator, and the anode upon one another several times. The electrode assembly is placed in a battery case and sealed.

Finally, the above non-aqueous electrolyte according to the present invention is injected into the battery case including the battery assembly to provide a complete lithium battery.

The present invention will be described in greater detail with reference to the following examples. The following examples are for illustrative purposes and are not intended to limit the scope of the invention.

In the following examples, lithium batteries were manufactured as 2016 half coin cells in order to measure their charge/discharge efficiency when the non-aqueous electrolyte according to the present invention was used.

EXAMPLE 1

Lithium metal electrodes were used for a cathode and an anode. A polyethylene separator (available from ASHAI CO., Japan) was interposed between the cathode and the anode to manufacture an electrode assembly by sequential stacking. The electrode assembly was placed in a battery case, and a non-aqueous electrolyte according to the present invention was injected into the battery case to provide a complete lithium ion secondary battery. The non-aqueous electrolyte contained 1.15M $LiPF_6$ as a lithium salt, a mixture of ethylene carbonate (EC), dimethylcarbonate (DMC), ethylmethyl carbonate (EMC), and propylene carbonate (PC) in a ratio of 3:3:3:1 by volume as an organic solvent, and 0.01 parts by weight of dimethyl malonate with respect to 100 parts by weight of the organic solvent.

EXAMPLE 2

A lithium ion secondary battery was manufactured in the same manner as in Example 1, except that 0.03 parts by weight of dimethyl malonate was used.

EXAMPLE 3

A lithium ion secondary battery was manufactured in the same manner as in Example 1, except that 0.05 parts by weight of dimethyl malonate was used.

EXAMPLE 4

A lithium ion secondary battery was manufactured in the same manner as in Example 1, except that 0.1 parts by weight of dimethyl malonate was used.

EXAMPLE 5

A lithium ion secondary battery was manufactured in the same manner as in Example 1, except that 0.2 parts by weight of dimethyl malonate was used.

EXAMPLE 6

A lithium ion secondary battery was manufactured in the same manner as in Example 1, except that 0.5 parts by weight of dimethyl malonate was used.

EXAMPLE 7

A lithium ion secondary battery was manufactured in the same manner as in Example 1, except that 0.01 parts by weight of ethylbutyl acetate instead of 0.01 parts by weight of dimethyl malonate was used.

EXAMPLE 8

A lithium ion secondary battery was manufactured in the same manner as in Example 1, except that 0.03 parts by weight of ethylbutyl acetate instead of 0.01 parts by weight of dimethyl malonate was used.

EXAMPLE 9

A lithium ion secondary battery was manufactured in the same manner as in Example 1, except that 0.05 parts by weight of ethylbutyl acetate instead of 0.01 parts by weight of dimethyl malonate was used.

EXAMPLE 10

A lithium ion secondary battery was manufactured in the same manner as in Example 1, except that 0.1 parts by weight of ethylbutyl acetate instead of 0.01 parts by weight of dimethyl malonate was used.

EXAMPLE 11

A lithium ion secondary battery was manufactured in the same manner as in Example 1, except that 0.2 parts by weight of ethylbutyl acetate instead of 0.01 parts by weight of dimethyl malonate was used.

EXAMPLE 12

70 parts by weight of sulfur, 10 parts by weight of carbon (Ketjen black), and 10 parts by weight of polyethylene oxide were mixed in acetonitrile to prepare a cathode active material composition.

The cathode active material composition was coated on a surface of an aluminum base coated with carbon and dried to manufacture a cathode. A lithium metal electrode was used for an anode.

A polyethylene separator (available from ASHAI CO., Japan) was interposed between the cathode and the anode to manufacture an electrode assembly by sequential stacking. The electrode assembly was placed in a battery case, and a non-aqueous electrolyte according to the present invention was injected into the battery case to provide a complete lithium sulfur battery. The non-aqueous electrolyte contained 1M $LiN(SO_2CF_3)_2$ as a lithium salt, a mixture of diglyme (DGM), dimethoxyethane (DME), and 1,3-dioxolane (DOX) in a ratio of 4:4:2 by volume as an organic solvent, and 0.01 parts by weight of dimethyl malonate with respect to 100 parts by weight of the organic solvent.

EXAMPLE 13

A lithium sulfur battery was manufactured in the same manner as in Example 12, except that 0.03 parts by weight of dimethyl malonate was used.

EXAMPLE 14

A lithium sulfur battery was manufactured in the same manner as in Example 12, except that 0.05 parts by weight of dimethyl malonate was used.

EXAMPLE 15

A lithium sulfur battery was manufactured in the same manner as in Example 12, except that 0.1 parts by weight of dimethyl malonate was used.

EXAMPLE 16

A lithium sulfur battery was manufactured in the same manner as in Example 12, except that 0.2 parts by weight of dimethyl malonate was used.

EXAMPLE 17

A lithium sulfur battery was manufactured in the same manner as in Example 12, except that 0.05 parts by weight of ethylbutyl acetate instead of 0.01 parts by weight dimethyl malonate was used.

EXAMPLE 18

A lithium sulfur battery was manufactured in the same manner as in Example 12, except that 0.1 parts by weight of ethylbutyl acetate instead of 0.01 parts by weight dimethyl malonate was used.

EXAMPLE 19

A lithium sulfur battery was manufactured in the same manner as in Example 12, except that 0.5 parts by weight of ethylbutyl acetate instead of 0.01 parts by weight dimethyl malonate was used.

EXAMPLE 20

A lithium sulfur battery was manufactured in the same manner as in Example 12, except that 1.0 parts by weight of ethylbutyl acetate instead of 0.01 parts by weight dimethyl malonate was used.

COMPARATIVE EXAMPLE 1

A lithium ion secondary battery was manufactured in the same manner as in Example 1, except that no dimethyl malonate was added in the preparation of the electrolytic solution.

COMPARATIVE EXAMPLE 2

A lithium sulfur battery was manufactured in the same manner as in Example 12, except that no dimethyl malonate was added in the preparation of the electrolytic solution.

Charge/discharge efficiency was measured using the lithium ion secondary batteries manufactured in Examples 1 though 6 and Comparative Example 1. The results are shown in FIG. 1. As is apparent from FIG. 1, the lithium ion secondary batteries of Examples 1 through 6 have higher change/discharge efficiency than the lithium ion secondary battery of Comparative Example 1 not containing dimethyl malonate, which is an additive used in the present invention.

Figure 2:
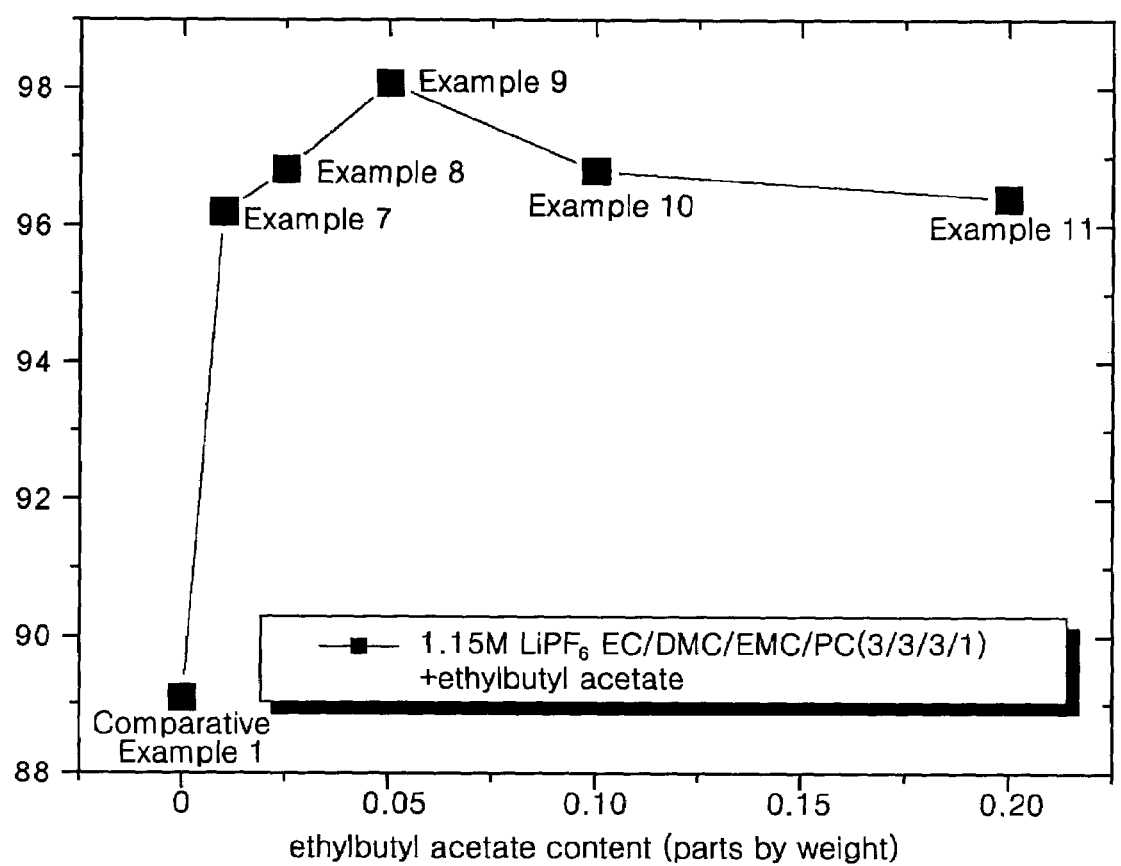
FIG. 2 is a graph of charge/discharge efficiency versus ethylbutyl acetate content for lithium ion secondary batteries manufactured in Examples 7 through 11 according to the present invention and Comparative Example 1.

Charge/discharge efficiency was measured using the lithium ion secondary batteries manufactured in Examples 7 through 11. The results are shown in FIG. 2. As is apparent from FIG. 2, the lithium ion secondary batteries of Examples 7 through 11 have higher charge/discharge efficiency than the lithium ion secondary battery of Comparative Example 1 not containing ethylbutyl acetate, which is an additive used in the present invention.

Figure 3:
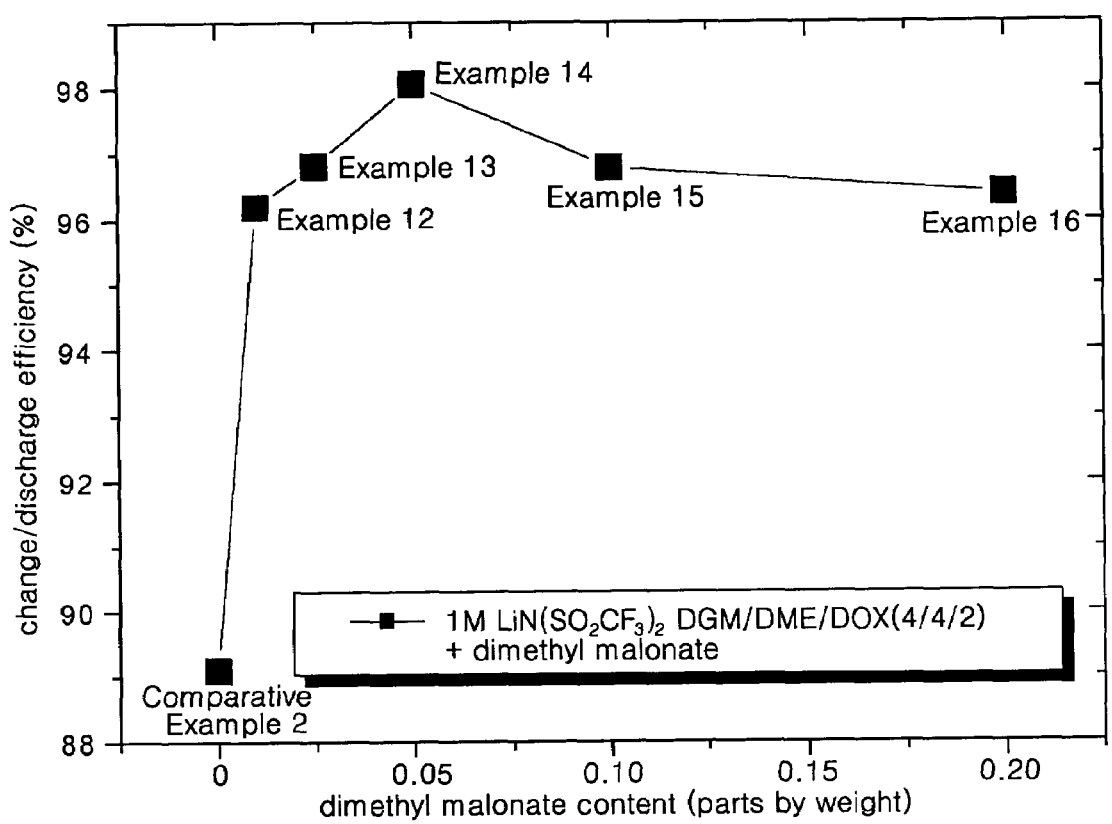
FIG. 3 is a graph of charge/discharge efficiency versus dimethyl malonate content for lithium sulfur batteries manufactured in Examples 12 through 16 according to the present invention and Comparative Example 1.

Charge/discharge efficiency was measured using the lithium sulfur batteries manufactured in Examples 12 through 16 and Comparative Example 2. The results are shown in FIG. 3. As is apparent from FIG. 3, the lithium sulfur batteries of Examples 12 through 16 have higher charge/discharge efficiency than the lithium sulfur battery of Comparative Example 2 not containing dimethyl malonate.

Figure 4:
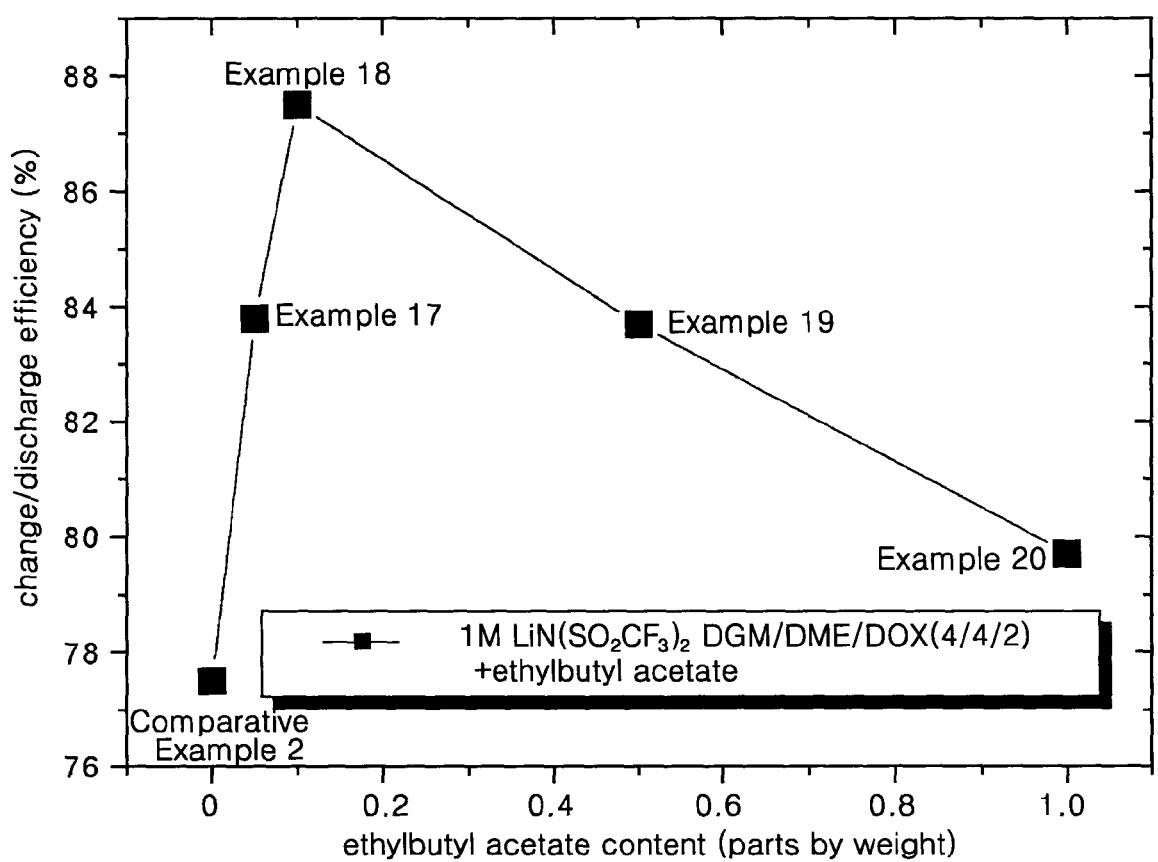
FIG. 4 is a graph of charge/discharge efficiency versus ethylbutyl acetate content for lithium sulfur batteries manufactured in Examples 17 through 20 according to the present invention and Comparative Example 2.

Charge/discharge efficiency was measured using the lithium sulfur batteries manufactured in Examples 17 through 20. The results are shown in FIG. 4. As is apparent from FIG. 4, the lithium sulfur batteries of Examples 17 through 20 have higher charge/discharge efficiency than the lithium sulfur battery of Comparative Example 2 not containing ethylbutyl acetate.

As described above, a non-aqueous electrolyte according to the present invention that contains an additive of formula (1) above effectively stabilizes lithium metal and improves the conductivity of lithium ions. Therefore, the non-aqueous electrolyte can improve charge/discharge efficiency when used in lithium ion batteries and lithium sulfur batteries, which contain lithium metal in their anode.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A non-aqueous electrolytic solution comprising:
   a lithium salt;
   at least one organic solvent selected from the group consisting of diethyleneglycol dimethylether ($CH_3$ (OCH₂CH₂)₂OCH₃), diethyleneglycol diethylether (C₂H₅(OCH₂CH₂)₂OC₂H₅), triethyleneglycol dimethylether (CH₃(OCH₂CH₂)₃OCH₃), triethyleneglycol diethylether (C₂H₅(OCH₂CH₂)₃OC₂H₅), 1,3-dioxolane, 4,5-diethyl-dioxolane, 4,5-dimethyl-dioxolane, 4-methyl-1,3-dioxolane, and 4-ethyl-1,3-dioxolane; and at least one of compounds having formula (1) below:

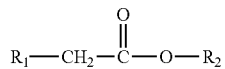 (1)

wherein 0.1-5 parts by weight of the at least one of compound having formula (1) is present with respect to 100 parts by weight of said organic solvent, and where $R_1$ is selected from the group consisting of a hydrogen atom, a halogen atom, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ alkenyl group, a substituted or unsubstituted $C_6$-$C_{30}$ aryl group, a substituted or unsubstituted $C_6$-$C_{30}$ aryloxy group, a substituted or unsubstituted $C_2$-$C_{30}$ heteroaryl group, a substituted or unsubstituted $C_2$-$C_{30}$ heteroaryloxy group, and

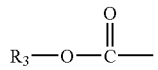

where $R_3$ is selected from the group consisting of a hydrogen atom, a halogen atom, a substituted or unsubstituted $C_1$-$C_{20}$ alkyl group, a substituted or unsubstituted $C_1$-$C_{20}$ alkenyl group, a substituted or unsubstituted $C_6$-$C_{30}$ aryl group, and a substituted or unsubstituted $C_2$-$C_{30}$ heteroaryl group; and $R_2$ is selected from the group consisting of a hydrogen atom, a halogen atom, a substituted or unsubstituted $C_1$-$C_{20}$ alkyl group, a substituted or unsubstituted $C_1$-$C_{20}$ alkenyl group, a substituted or unsubstituted $C_6$-$C_{30}$ aryl group, and a substituted or unsubstituted $C_2$-$C_{30}$ heteroaryl group.

2. The non-aqueous electrolytic solution of claim 1, wherein the at least one of the compounds of said formula (1) is one of a compound of formula (2) below, a compound of formula (3) below, and a mixture of the forgoing compounds:

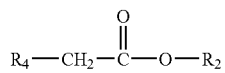 (2)

where $R_4$ is selected from the group consisting of a hydrogen atom, a halogen atom, a hydroxy group, a substituted or unsubstituted $C_1$-$C_{20}$ alkyl group, a substituted or unsubstituted $C_1$-$C_{20}$ alkoxy group, a substituted or unsubstituted $C_1$-$C_{20}$ alkenyl group, a substituted or unsubstituted $C_6$-$C_{30}$ aryl group, a substituted or unsubstituted $C_6$-$C_{30}$ aryloxy group, a substituted or unsubstituted $C_2$-$C_{30}$ heteroaryl group, and a substituted or unsubstituted $C_2$-$C_{30}$ heteroaryloxy group; and $R_2$ is selected from the group consisting of a hydrogen atom, a halogen atom, a substituted or unsubstituted $C_1$-$C_{20}$ alkyl group, a substituted or unsubstituted $C_1$-$C_{20}$ alkenyl group, a substituted or unsubstituted $C_6$-$C_{30}$ aryl group, and a substituted or unsubstituted $C_2$-$C_{30}$ heteroaryl group, and

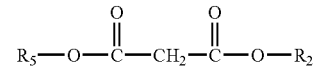 (3)

where $R_5$ is selected from the group consisting of a hydrogen atom, a halogen atom, a substituted or unsubstituted $C_1$-$C_{20}$ alkyl group, a substituted or unsubstituted $C_1$-$C_{20}$ alkenyl group, a substituted or unsubstituted $C_6$-$C_{30}$ aryl group, and a substituted or unsubstituted $C_2$-$C_{30}$ heteroaryl group; and $R_2$ is selected from the group consisting of a hydrogen atom, a halogen atom, a substituted or unsubstituted $C_1$-$C_{20}$ alkyl group, a substituted or unsubstituted $C_1$-$C_{20}$ alkenyl group, a substituted or unsubstituted $C_6$-$C_{30}$ aryl group, and a substituted or unsubstituted $C_2$-$C_{30}$ heteroaryl group.

3. The non-aqueous electrolytic solution of claim 2, wherein the compound of said formula (2) is one of dimethyl acetate, methylethyl acetate, methylbutyl acetate, diethyl acetate, ethylmethyl acetate, ethylbutyl acetate, dibutyl acetate, butylethyl acetate, and butylmethyl acetate.

4. The non-aqueous electrolytic solution of claim 2, wherein the compound of said formula (3) is one of dimethyl malonate, methylethyl malonate, methylbutyl malonate, diethyl malonate, ethylmethyl malonate, ethylbutyl malonate, dibutyl malonate, butylethyl malonate, and butylmethyl malonate.

5. The non-aqueous electrolytic solution of claim 1, wherein the organic solvent is a polyglyme and is at least one selected from the group consisting of diethyleneglycol dimethylether (CH₃(OCH₂CH₂)₂OCH₃), diethyleneglycol diethylether (C₂H₅(OCH₂CH₂)₂OC₂H₅), triethyleneglycol dimethylether (CH₃(OCH₂CH₂)OCH₃), and triethyleneglycol diethylether (C₂H₅(OCH₂CH₂)₃OC₂H₅).

6. The non-aqueous electrolytic solution of claim 1, wherein the organic solvent is a dioxolane and is at least one selected from the group consisting of 1,3-dioxolane, 4,5-diethyl-dioxolane, 4,5-dimethyl-dioxolane, 4-methyl-1,3-dioxolane, and 4-ethyl-1,3-dioxolane.

7. The non-aqueous electrolytic solution of claim 1, wherein the concentration of the lithium salt is in a range of 0.5-2.0M.

8. A lithium battery comprising:
a cathode;
an anode;
a separator interposed between the cathode and the anode; and
the non-aqueous electrolytic solution of claim 1.

9. The lithium battery of claim 8, wherein the cathode is made of at least one selected from the group consisting of a lithium composite oxide, a simple substance sulfur, kasolite containing dissolved $Li_2S_n$, where $n \geq 1$, organo-sulfur, and a carbon-sulfur composite polymer expressed as $(C_2S_x)_y$, where x ranges from 2.5 to 20 and $y \geq 2$.

10. The lithium battery of claim 8, wherein the anode is one of a lithium metal electrode, a lithium-metal alloy electrode, and a lithium-inert sulfur composite electrode.

11. A lithium battery comprising:
a cathode;
an anode;
a separator interposed between the cathode and the anode; and
the non-aqueous electrolytic solution of claim 2.

12. A lithium battery comprising:
a cathode;
an anode;
a separator interposed between the cathode and the anode; and
the non-aqueous electrolytic solution of claim 3.

13. A lithium battery comprising:
a cathode;
an anode;
a separator interposed between the cathode and the anode; and
the non-aqueous electrolytic solution of claim 4.

14. A lithium battery comprising:
a cathode;
an anode;
a separator interposed between the cathode and the anode; and
the non-aqueous electrolytic solution of claim 5.

15. A lithium battery comprising:
a cathode;
an anode;
a separator interposed between the cathode and the anode; and
the non-aqueous electrolytic solution of claim 6.

16. A lithium battery comprising:
a cathode;
an anode;
a separator interposed between the cathode and the anode; and
the non-aqueous electrolytic solution of claim 7.

* * * * *